(12) United States Patent
Grolimund et al.

(10) Patent No.: US 9,707,634 B2
(45) Date of Patent: Jul. 18, 2017

(54) HACKSAW BLADE FOR A POWER TOOL

(71) Applicant: Robert Bosch GmbH, Stuttgart (DE)

(72) Inventors: Daniel Grolimund, Zuchwil (CH);
Wilfried Kern, Deitingen (CH);
Martin Kocher, Solothurn/Schweiz (CH)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 14/200,123

(22) Filed: Mar. 7, 2014

(65) Prior Publication Data

US 2014/0260879 A1    Sep. 18, 2014

(30) Foreign Application Priority Data

Mar. 13, 2013  (DE) .................. 10 2013 204 372

(51) Int. Cl.
*B23D 61/12*    (2006.01)
(52) U.S. Cl.
CPC ........... *B23D 61/12* (2013.01); *B23D 61/121* (2013.01); *Y10T 83/9319* (2015.04)
(58) Field of Classification Search
CPC .... B23D 21/121; B23D 61/12; B23D 61/025; B23D 61/123; B23D 45/003; B23D 57/00; B23D 65/12; B23D 61/128; Y10T 83/9319; Y10T 83/9372
USPC ......... 83/835, 663, 837, 848, 855, 592, 697, 83/846, 856, 847, 851; 144/28, 235, 237, 144/236, 240, 218; 30/394, 356, 392, 30/503, 503.5, 353, 355; D8/20, 70; 173/213
See application file for complete search history.

(56) References Cited

U.S. PATENT DOCUMENTS

| | | | | |
|---|---|---|---|---|
| 72,983 | A * | 1/1868 | Davis ................... | B23D 61/121 83/848 |
| 336,739 | A * | 2/1886 | Parker ................. | B23D 61/121 83/848 |
| 2,735,458 | A * | 2/1956 | Buchmann .......... | B23D 51/025 83/835 |
| 5,295,426 | A * | 3/1994 | Planchon ............ | B23D 61/121 30/392 |
| 6,782,781 | B2 * | 8/2004 | Rack ................... | B23D 61/126 30/392 |
| D732,914 | S * | 6/2015 | Hampton ......................... | D8/20 |
| 2001/0006017 | A1* | 7/2001 | Osada ................... | B23D 61/12 83/697 |
| 2005/0211023 | A1* | 9/2005 | Kalo ...................... | B23D 63/00 76/112 |
| 2008/0201964 | A1* | 8/2008 | Camargo ............. | B23D 61/121 30/353 |

FOREIGN PATENT DOCUMENTS

| | | |
|---|---|---|
| DE | 37 06 429 A1 | 9/1988 |
| DE | 42 31 498 A1 | 3/1994 |
| DE | 10 2007 039 240 A1 | 2/2009 |
| JP | 2004-119829 A | 4/2004 |
| JP | 2011-131317 A | 7/2011 |

* cited by examiner

*Primary Examiner* — Ghassem Alie
(74) *Attorney, Agent, or Firm* — Maginot, Moore & Beck LLP

(57) ABSTRACT

A hacksaw blade has a blade body that includes a cutting edge. One cutting-edge section is embodied in a concavely curved manner and at least one further cutting-edge section is embodied in a non-concave manner.

29 Claims, 3 Drawing Sheets

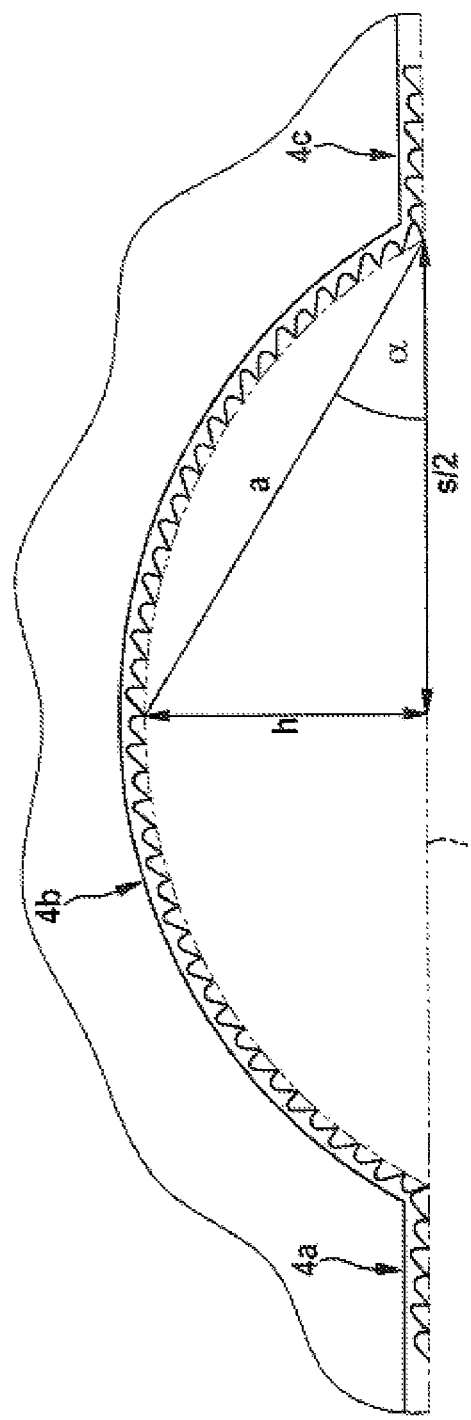

HACKSAW BLADE FOR A POWER TOOL

This application claims priority under 35 U.S.C. §119 to patent application no. DE 10 2013 204 372.4, filed on Mar. 13, 2013 in Germany, the disclosure of which is incorporated herein by reference in its entirety.

The disclosure relates to a hacksaw blade for a power tool, for example a jigsaw blade or reciprocating saw blade

BACKGROUND

Hacksaw blades for portable power tools, which have a blade body which has a cutting edge having cutting teeth, and a fixing shank, via which the saw blade is fixable to the power tool, are known. Along its length, the cutting edge can have a concavely curved profile, as is described for example in JP 1999-373399, in DE 37 06 429 A1 or in JP 2004/119829. As a result of the concave shape, an improved sawing rate is intended to be achieved with low expenditure of force.

SUMMARY

The disclosure is based on the object of using simple structural measures to configure a hacksaw blade, which executes an oscillating reciprocating movement during operation, such that precise workpiece machining is possible with a high cutting capacity over a long operating period. The disclosure relates to a hacksaw blade, for example a jigsaw blade or reciprocating saw blade, which executes an oscillating, reciprocating translatory working movement during operation. The hacksaw blade has a blade body having a cutting edge on which cutting teeth are arranged. A fixing shank, via which the saw blade can be fixed in a receiving device of the power tool, is connected to the blade body. The fixing shank is preferably formed in one piece with the blade body, with a multi-part embodiment also optionally coming into consideration.

The cutting edge on the blade body has at least two differently shaped cutting-edge sections, of which one section is concavely curved, such that the cutting edge of the concave section is set back upwardly, and a further section, which immediately adjoins the concave section, is embodied in a non-concave manner. As a result, improved adaptation to particular workpiece geometries is possible, and so the latter can be machined with greater precision over an extended lifetime and with a greater cutting capacity. For example, tubular cross sections can be severed better with a saw blade which has concave and non-concave sections.

The non-concave cutting-edge section is advantageously configured in a rectilinear manner and is located, according to a further expedient embodiment, adjacent to the saw blade tip. Thus, the concave cutting-edge section is located at a distance from the saw blade tip, and the section between the saw blade tip and the concave section is configured in a rectilinear manner. As a result, in particular sawing in the region adjacent to the saw blade tip is improved.

It may furthermore be expedient for the concave cutting-edge section to be at a distance from the rear end, facing the fixing shank, of the cutting edge. In conjunction with the distance from the saw blade tip, the concave cutting-edge section is thus located at a distance both from the front and from the rear end of the cutting edge. A non-concave section, which is advantageously rectilinear and in particular in alignment with the front, rectilinear section adjacent to the cutting-edge tip, is also located, in this embodiment, between the concave cutting-edge section and the rear end of the cutting edge.

It may be expedient to arrange the concave cutting-edge section eccentrically on the cutting edge, in particular such that the distance from the front end of the cutting edge is greater than the distance from the rear end of the cutting edge. The distance from the front end of the cutting edge is for example at least twice as large as the distance from the rear end of the cutting edge. Thus, a comparatively long, non-concave cutting-edge section, which is preferably configured in a rectilinear manner and in particular improves and makes easier the separating behavior during the machining of tubular workpieces, arises in the front part.

According to a further expedient embodiment, the concave cutting-edge section is at least as long as the entire non-concave cutting-edge sections taken together. In this way, a sufficiently long concave section is ensured, which allows efficient machining in particular of curved workpieces while having an improved cutting-in behavior.

The height of the concave cutting-edge section—as seen orthogonally to the cutting edge—is advantageously dimensioned such that an angle of taper is at most 3°, in particular at least approximately 1°, wherein the angle of taper designates the angle between the connecting line between the end points of the concave cutting-edge section and the connecting line between one of the end points and the maximum height of the concave cutting-edge section.

According to a further expedient embodiment, the blade body can consist of a bimetal combination. The concave cutting-edge section can be restricted to a relatively hard HSS strip for the row of teeth, without extending into the carrier made of softer material.

According to a further expedient embodiment, the back, located opposite the cutting edge, of the blade body is configured in a rectilinear manner. To the extent that the cutting edge has rectilinear sections, these extend parallel to the rectilinear back of the blade body.

The curvature of the concave cutting-edge section can, according to an advantageous embodiment, be produced simultaneously with the introduction of the toothing during the production of the saw blade and thus takes place over the cutting-edge side. By contrast, the back of the saw blade, given a rectilinear embodiment of the back, remains unaffected.

The toothing geometry can have constant or non-constant values with regard to pitch, height and angle.

The length of the concave cutting-edge section can also be determined by parameters of the power tool in which the saw blade is inserted. Thus, it is for example expedient for the length of the concave cutting-edge section to correspond at least to a single stroke, preferably to a multiple of the stroke, for example to twice the stroke, which the saw blade executes during sawing operation.

Optionally, further dependences of the geometric parameters of the concave cutting-edge section also come into consideration. Thus, it is for example possible also to set the length of the concave cutting-edge section in dependence on the diameter or the curvature of the workpiece to be machined. For example, the length of the concave cutting-edge section is at least as large as the diameter, preferably a multiple of the diameter, for example twice as large as the diameter of the pipes to be machined.

BRIEF DESCRIPTION OF THE DRAWINGS

Further advantages and expedient embodiments can be gathered from the claims, the description of the figures and the drawings, in which:

Figure 1:
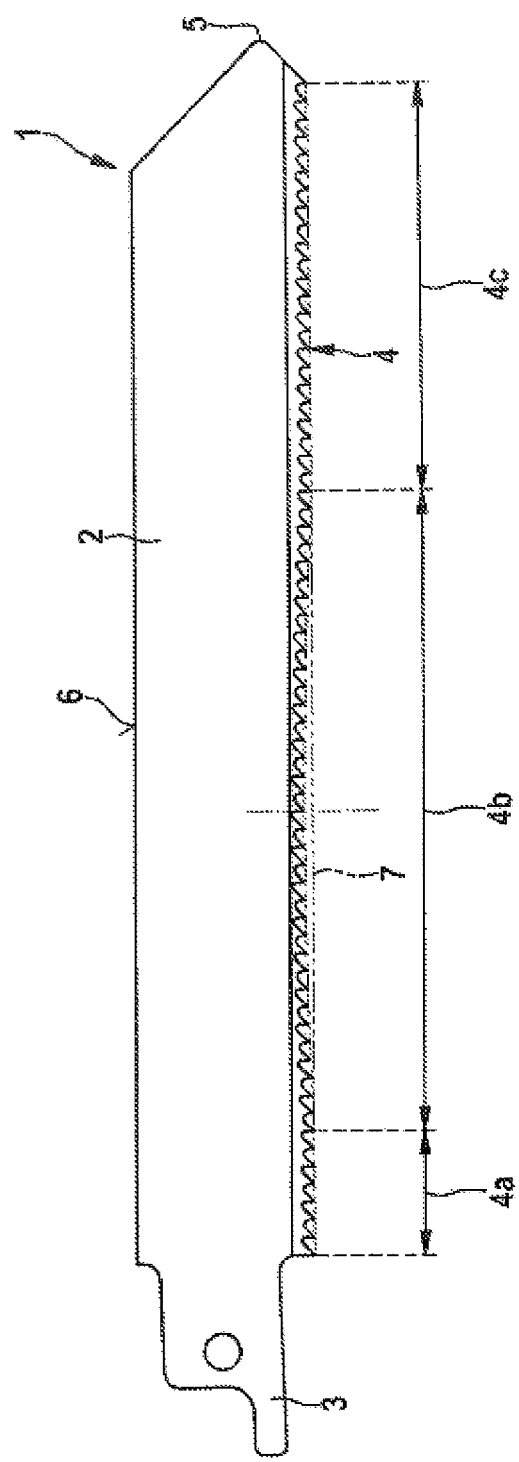
Figure 2:
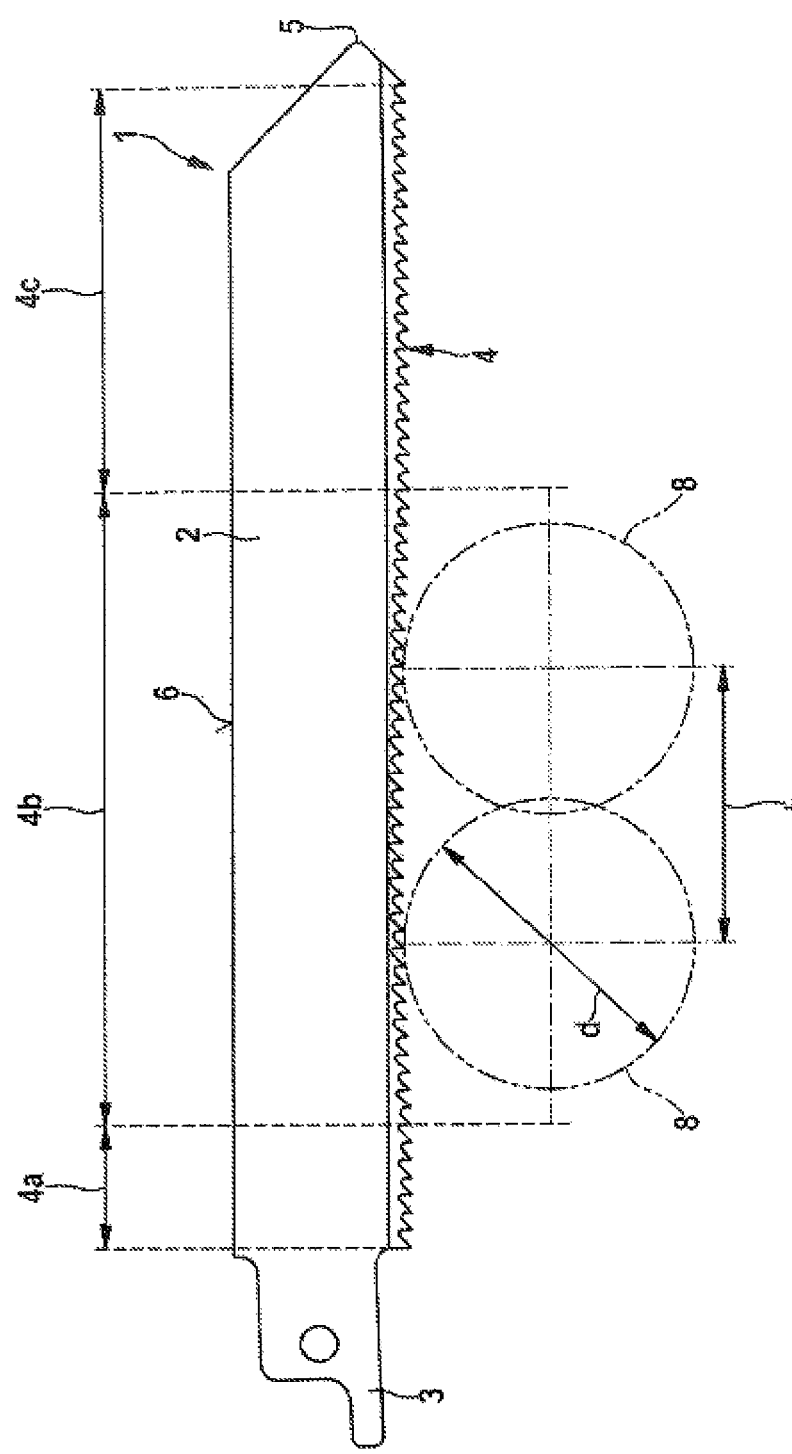

FIG. 1 shows a side view of a saw blade for a jigsaw or reciprocating saw, having a blade body with a cutting edge on which cutting teeth are formed, and having an integrally configured fixing shank for clamping into the power tool, wherein a section of the cutting edge is configured in a concave manner, FIG. 2 shows a saw blade corresponding to FIG. 1, having additional ratio details relating to the length of the concave cutting-edge section, FIG. 3 shows the concave cutting-edge section in an illustration with exaggeration of the concave elevation.

In the figures, identical components are provided with identical reference signs.

DETAILED DESCRIPTION

The saw blade illustrated in the figures is in the form of a hacksaw blade for a reciprocating saw or jigsaw and, during operation of the power tool, executes a translatory, oscillating, reciprocating working movement. The power tool is preferably a handheld power tool.

The saw blade 1 illustrated in FIGS. 1 and 2 has a blade body 2 and a fixing shank 3, via which the saw blade 1 is connected to a receiving device of the power tool. The blade body 2 and the fixing shank 3 are formed in one piece.

The blade body 2 has a cutting edge 4 having cutting teeth, which extends between a rear end, which faces the fixing shank 3, and a front end, which is located adjacent to the saw blade tip 5. The back 6, opposite the cutting edge 4, on the blade body 2 is embodied in a rectilinear manner. The cutting edge 4 extends at least sectionally parallel to the back 6.

The cutting edge 4 is subdivided into a total of three sections 4a, 4b and 4c that adjoin one another. The first section 4a, which immediately adjoins the fixing shank 3, is configured in a rectilinear manner, as is the front section 4c facing the saw blade tip 5. These two rectilinear sections 4a, 4c are aligned and extend parallel to the back 6.

The intermediate section 4b, arranged between the two rectilinear sections 4a and 4c, of the cutting edge is formed in a concave manner and has an indentation facing the back 6, as can be seen by way of the connecting line 7 which connects the two rectilinear cutting-edge sections 4a and 4c. The tooth tips of the cutting teeth or saw teeth are at a distance from the connecting line 7 in the region of the concave cutting-edge section 4b.

The length of each section 4a, 4b, 4c is configured to be different. The central cutting-edge section 4b, embodied in a concave manner, is placed eccentrically with respect to the longitudinal axis and is at a greater distance from the saw blade tip 5 than from the rear fixing shank 3. Accordingly, the front, rectilinear cutting-edge section 4c is embodied in a longer manner than the rear, likewise rectilinear cutting-edge section 4a. In the exemplary embodiment, the front, rectilinear cutting-edge section 4c is more than twice as long as the rear, rectilinear cutting-edge section 4a. In the case of a blade length other than that illustrated, for example the section 4c adjacent to the saw blade tip 5 can be modified or the length of the concave section 4b can be changed.

In the depicted example, the central, concave cutting-edge section 4b has a length which corresponds at least to the sum of the other cutting-edge sections 4a, 4c. Depending on the blade length, however, the section 4c can be disproportionately larger and thus reduce the ratio.

The concave cutting-edge section 4b can optionally be embodied in a part-circular manner.

In FIG. 2, the hacksaw blade 1 is illustrated with the length of the concave cutting-edge section 4b in relation to two typical tubular workpieces 8 having a diameter d. The length of the concave cutting-edge section 4b is in this case at least twice as large as the diameter d of the pipes 8 to be machined. Ideally, the starting point or shank of the concave cutting-edge section 4b is located in front of the bearing point of the workpiece.

Also indicated in FIG. 2 is the stroke b which the saw blade 1 executes during the machining of a workpiece. The length of the concave cutting-edge section 4b is likewise at least twice as large as the stroke b.

The length of the front, rectilinear cutting-edge section 4c is additionally at least twice as large as the length of the rear, rectilinear cutting-edge section 4a.

In FIG. 3, the cutting edge having the sections 4a, 4b and 4c is illustrated with an exaggerated central, concave section 4b. The concave cutting-edge section 4b has an angle of taper a, which designates the angle between the connecting line 7, which extendates at the height of the tooth tips of the rectilinear cutting-edge sections 4a, 4c, and a connecting line a which is located between one of the end points, for example the front end point of the concave cutting-edge section 4b, and the maximum height h of this cutting-edge section 4b. The angle α can also be determined from the tangent of the ratio of the height h to half the chord s/2 of the concave section 4b. This angle of taper α is preferably at most 3°, in particular at least approximately 1°.

What is claimed is:

1. A hacksaw blade for a power tool, comprising:
    a blade body that includes a cutting edge with cutting teeth, the entire cutting edge being the only cutting edge of the blade having only;
        a concavely curved cutting-edge section having cutting teeth;
        a first non-concave cutting-edge section having cutting teeth and adjoining the concavely curved cutting-edge section at a rear end of the blade body; and
        a second non-concave cutting-edge section having cutting teeth and adjoining the concavely curved cutting-edge section at an opposite front end of the blade body,
    wherein the second non-concave cutting-edge section has a length greater than the length of the first non-concave cutting-edge section, and
    wherein the concavely curved cutting-edge section has a length at least equal to the combined length of the first and second non-concave cutting-edge sections.

2. The hacksaw blade according to claim 1, wherein at least one of the non-concave cutting-edge sections is rectilinear along its entire length.

3. The hacksaw blade according to claim 1, wherein the concavely curved cutting-edge section is located at a distance from the front end of the cutting edge.

4. The hacksaw blade according to claim 1, wherein:
    the concavely curved cutting-edge section is located at a distance from the rear end of the cutting edge, the rear end facing a fixing shank of the cutting edge; and
    the hacksaw blade is configured to be securable to a power tool via the fixing shank.

5. The hacksaw blade according to claim 3, wherein the concavely curved cutting-edge section is located at a second distance from the rear end of the cutting edge.

6. The hacksaw blade according to claim 5, wherein the distance is greater than the second distance.

7. The hacksaw blade according to claim 1, wherein a length of the concavely curved cutting-edge section is at least one of;
 at least as long as a diameter of a workpiece to be separated; and
 a multiple of the diameter.

8. The hacksaw blade according to claim 1, wherein:
 the concavely curved cutting-edge section includes a taper angle of at most three (3) degrees; and
 the taper angle corresponds to an angle between a first connecting line between end points of the concavely curved cutting-edge section and a second connecting line between one end point of the concavely curved cutting-edge section and a maximum height of the concavely curved cutting-edge section.

9. The hacksaw blade according to claim 8, wherein the taper angle is at least approximately one (1) degree.

10. The hacksaw blade according to claim 1, wherein a back of the blade body is rectilinear along its entire length.

11. The hacksaw blade according to claim 1, wherein a length of the concavely curved cutting-edge section is at least one of;
 at least a length of a stroke of the hacksaw blade during sawing operation; and
 a multiple of the length of the stroke.

12. The hacksaw blade according to claim 1, wherein the first and second non-concave cutting-edge sections are aligned and parallel to each other.

13. A power tool, comprising:
 a hacksaw blade, including;
 a blade body having a cutting edge with cutting teeth, the entire cutting edge being the only cutting edge of the blade including only;
  a concavely curved cutting-edge section having cutting teeth;
  a first non-concave cutting-edge section having cutting teeth and adjoining the concavely curved cutting-edge section at a rear end of the blade body; and
  a second non-concave cutting-edge section having cutting teeth and adjoining the concavely curved cutting-edge section at an opposite front end of the blade body,
 wherein the second non-concave cutting-edge section has a length greater than the length of the first non-concave cutting-edge section, and
 wherein the concavely curved cutting-edge section has a length at least equal to the combined length of the first and second non-concave cutting-edge sections; and
 a fixing shank at the rear end of the blade body configured to be securable to the power tool.

14. The hacksaw blade according to claim 13, wherein the blade body includes a back edge opposite said cutting edge, said back edge having no cutting teeth.

15. The hacksaw blade according to claim 13, wherein the first and second non-concave cutting-edge sections are aligned and parallel to each other.

16. A hacksaw blade for a power tool, comprising:
 a blade body that includes a back and a cutting edge opposite the back with cutting teeth, the entire cutting edge being the only cutting edge of the blade having only;
  a concavely curved cutting-edge section having cutting teeth along the entire length of the concavely curved cutting-edge section;
  a first non-concave cutting-edge section having cutting teeth along the entire length of the first non-concave cutting-edge section and adjoining the concavely curved cutting-edge section at a rear end of the blade body; and
  a second non-concave cutting-edge section having cutting teeth along the entire length of the second non-concave cutting-edge section and adjoining the concavely curved cutting-edge section at an opposite front end of the blade body,
 wherein the first non-concave cutting-edge section and the second non-concave cutting-edge section are rectilinear along their entire respective length, and
 wherein the back of the blade body has no cutting edge with cutting teeth.

17. The hacksaw blade according to claim 16, wherein the concavely curved cutting-edge section is located at a distance from the front end of the cutting edge.

18. The hacksaw blade according to claim 16, wherein:
 the concavely curved cutting-edge section is located at a distance from the rear end of the cutting edge, the rear end facing a fixing shank of the cutting edge; and
 the hacksaw blade is configured to be securable to a power tool via the fixing shank.

19. The hacksaw blade according to claim 17, wherein the concavely curved cutting-edge section is located at a second distance from the rear end of the cutting edge.

20. The hacksaw blade according to claim 19, wherein the distance is greater than the second distance.

21. The hacksaw blade according to claim 16, wherein a length of the concavely curved cutting-edge section is at least one of;
 at least as long as a diameter of a workpiece to be separated; and
 a multiple of the diameter.

22. The hacksaw blade according to claim 16, wherein:
 the concavely curved cutting-edge section includes a taper angle of at most three (3) degrees; and
 the taper angle corresponds to an angle between a first connecting line between end points of the concavely curved cutting-edge section and a second connecting line between one end point of the concavely curved cutting-edge section and a maximum height of the concavely curved cutting-edge section.

23. The hacksaw blade according to claim 22, wherein the taper angle is at least approximately one (1) degree.

24. The hacksaw blade according to claim 16, wherein a back of the blade body is rectilinear along its entire length.

25. The hacksaw blade according to claim 16, wherein a length of the concavely curved cutting-edge section is at least one of;
 at least a length of a stroke of the hacksaw blade during sawing operation; and
 a multiple of the length of the stroke.

26. The hacksaw blade according to claim 16, wherein the second non-concave cutting-edge section has a length greater than the length of the first non-concave cutting-edge section.

27. The hacksaw blade according to claim 26, wherein the concavely curved cutting-edge section has a length at least equal to the combined length of the first and second non-concave cutting-edge sections.

28. The hacksaw blade according to claim 16, wherein the first non-concave cutting-edge section and the second non-concave cutting-edge section are aligned parallel to each other.

29. The hacksaw blade according to claim 1, wherein the blade body includes a back edge opposite said cutting edge, said back edge having no cutting teeth.

\* \* \* \* \*